(12) United States Patent
Ackley

(10) Patent No.: US 9,096,390 B2
(45) Date of Patent: Aug. 4, 2015

(54) APPARATUS AND METHOD FOR INSPECTING AND PROCESSING PELLET-SHAPED ARTICLES

(71) Applicant: Ackley Machine Corporation, Moorestown, NJ (US)

(72) Inventor: E. Michael Ackley, Mannington, NJ (US)

(73) Assignee: ACKLEY MACHINE CORPORATION, Moorestown, NJ (US)

( * ) Notice: Subject to any disclaimer, the term of this patent is extended or adjusted under 35 U.S.C. 154(b) by 33 days.

(21) Appl. No.: 14/032,452

(22) Filed: Sep. 20, 2013

(65) Prior Publication Data

US 2015/0083548 A1    Mar. 26, 2015

(51) Int. Cl.
| | |
|---|---|
| *B65G 47/24* | (2006.01) |
| *B07C 5/00* | (2006.01) |
| *B41F 17/08* | (2006.01) |
| *B65G 43/08* | (2006.01) |
| *B41F 17/36* | (2006.01) |
| *B65G 17/32* | (2006.01) |
| *B65G 17/12* | (2006.01) |

(52) U.S. Cl.
CPC . *B65G 43/08* (2013.01); *B07C 5/00* (2013.01); *B41F 17/36* (2013.01); *B65G 17/12* (2013.01); *B65G 17/32* (2013.01)

(58) Field of Classification Search
USPC ............ 198/383, 389, 390, 395, 617; 101/35, 101/40, 487; 209/580, 587; 356/237.1, 356/239.7; 347/111, 224
See application file for complete search history.

(56) References Cited

U.S. PATENT DOCUMENTS 3,618,764 A * 11/1971 Bawduniak .................. 209/580
3,884,143 A     5/1975 Ackley
4,143,770 A *  3/1979 Grimmell et al. ............. 209/558
(Continued)

FOREIGN PATENT DOCUMENTS

CA    2 672 587        6/2008
EP    2 241 520 A2   10/2010

OTHER PUBLICATIONS

Article: Frank Gaebler et al., "COHERENT—Laser Drilling Enables Advanced Drug Delivery Systems", Jan. 18, 2007, 7 pages, accessed on Sep. 18, 2013 at http://www.coherent.com/downloads/Pharma%20Mfg%20Magazine%20Tablet%20Drilling.pdf.

(Continued)

*Primary Examiner* — Douglas Hess
(74) *Attorney, Agent, or Firm* — Nixon & Vanderhye, P.C.

(57) ABSTRACT

A conveyer apparatus for inspecting and processing pellet-shaped articles, each of the pellet-shaped articles including a first side and a second side, the conveyer apparatus comprising: a conveyer including a plurality of carrier links to convey a plurality of pellet-shaped articles along a predetermined conveyer path; a first inspection unit including at least one camera to inspect the first side and/or the second side of each of the pellet-shaped articles and determine an orientation of each of the pellet-shaped articles on the conveyer; a processing unit including at least two processing devices, each on an opposite side of the conveyer to process the first side and the second side of each of the pellet-shaped articles; and a second inspection unit including at least one camera on each side of the conveyer to inspect the first side and/or the second side of the pellet-shaped articles after processing.

27 Claims, 6 Drawing Sheets

(56) References Cited

U.S. PATENT DOCUMENTS

| | | | | |
|---|---|---|---|---|
| 5,294,770 | A | * | 3/1994 | Riddle et al. ............... 219/121.7 |
| 5,376,771 | A | * | 12/1994 | Roy ........................ 219/121.71 |
| 5,746,323 | A | * | 5/1998 | Dragotta ....................... 209/539 |
| 5,878,658 | A | * | 3/1999 | Ackley ........................... 101/35 |
| 5,894,801 | A | * | 4/1999 | Ackley .......................... 101/485 |
| 7,102,741 | B2 | * | 9/2006 | Ackley et al. .............. 356/237.1 |
| 7,995,083 | B2 | | 8/2011 | Ackley, Jr. et al. |
| 8,037,992 | B2 | * | 10/2011 | Ackley, Jr. .................... 198/384 |
| 8,102,520 | B2 | * | 1/2012 | Ackley et al. .............. 356/237.1 |
| 8,141,697 | B2 | * | 3/2012 | Ackley, Jr. ............... 198/803.14 |
| 8,220,619 | B2 | * | 7/2012 | Ackley .................... 198/803.13 |
| 8,269,958 | B2 | | 9/2012 | Ackley, Jr. et al. |
| 8,381,896 | B2 | | 2/2013 | Ackley et al. |
| 8,593,494 | B2 | * | 11/2013 | Ackley et al. ................. 347/224 |
| 8,646,591 | B2 | * | 2/2014 | De Ruijter et al. ...... 198/397.01 |
| 8,770,413 | B2 | * | 7/2014 | Ackley et al. ................. 209/509 |
| 2012/0132722 | A1 | | 5/2012 | Ackley et al. |

OTHER PUBLICATIONS

European Communication with European Search Report for European Application No. 14185677.3-1706 dated Feb. 17, 2015, 4 pages.

* cited by examiner

APPARATUS AND METHOD FOR INSPECTING AND PROCESSING PELLET-SHAPED ARTICLES

FIELD OF THE TECHNOLOGY

The present technology relates to methods and apparatuses for transporting, inspecting, and processing pellet-shaped articles, e.g., tablets, caplets, lentil-shaped articles, etc.

BACKGROUND OF THE TECHNOLOGY

Inspecting and processing of pellet-shaped articles, such as marking, and/or laser drilling of pellet-shaped articles, is known in the art. Inspection units are typically configured to inspect and remove pellet-shaped articles from a conveyer mechanism that have been improperly processed in a previous processing operation. Processing operations may include marking the pellet-shaped articles with indicia, coloring the pellet-shaped articles, laser drilling holes in the pellet-shaped articles, and/or coating the pellet-shaped articles. These processing operations are typically completed upstream from the inspection unit such that the inspection unit may inspect if these processes have been properly completed.

It is important for the manufacturer to carefully inspect the pellet-shaped articles for defects, such as an improperly printed or coated side of the article, before the pellet-shaped article is distributed to the consumer so as to ensure the quality of the product and hence protect the safety of the consumer. Moreover, such defective articles must be separated from the acceptable articles based on the inspection results.

The pellet-shaped articles may also have distinct and defined sides, each requiring a different processing operation to be performed. Therefore, it may be desirable to identify and process each side of the pellet-shaped article accordingly.

BRIEF SUMMARY OF THE TECHNOLOGY

One aspect of the present technology is to provide a conveyer apparatus that overcomes one or more of the shortcomings of the prior art, e.g., to more accurately and efficiently process pellet-shaped articles.

Another aspect of the present technology is to provide method for inspecting and processing pellet-shaped articles overcomes one or more of the shortcomings of the prior art, e.g., to more accurately and efficiently process pellet-shaped articles.

Another aspect of the present technology is to provide methods and apparatuses to inspect and process either or both sides of pellet-shaped articles transported on a conveyer depending on the orientation of the sides of the pellet-shaped articles.

Another aspect of the present technology is to provide methods and apparatuses to inspect and process pellet-shaped articles transported on a conveyer in a vertical or on-edge orientation.

Another aspect of the present technology is directed to a conveyer apparatus for inspecting and processing pellet-shaped articles, each of the pellet-shaped articles including a first side with a first characteristic, a second side with a second characteristic opposite the first side, the first characteristic being visually distinguishable from the second characteristic, and a belly band that interconnects the first side and the second side. The conveyer apparatus may comprise: a conveyer including a plurality of carrier links to convey a plurality of pellet-shaped articles along a predetermined conveyer path, each carrier link having a pocket to receive and transport a pellet-shaped article in a vertical orientation along the predetermined conveyer path; a first inspection unit including at least one camera to inspect the first side and/or the second side of each of the pellet-shaped articles and determine an orientation of each of the pellet-shaped articles on the conveyer based on detection of the first characteristic and/or the second characteristic; a processing unit including at least two processing devices, each located on an opposite side of the conveyer to process the first side and the second side of each of the pellet-shaped articles based on the determined orientation; and a second inspection unit including at least one camera on each side of the conveyer to inspect the first side and/or the second side of the pellet-shaped articles after processing by the processing unit.

In examples (a) the at least two processing devices may include a first laser and a second laser to laser-drill a hole on the first side and laser-print a mark on the second side of each of the pellet-shaped articles based on the determined orientation, (b) the first inspection unit may comprise a first camera and a second camera, each located on an opposite side of the conveyer to inspect one of the first side and the second side of each of the pellet-shaped articles, (c) the second inspection unit may comprise a third camera and a fourth camera, each located on an opposite side of the conveyer to inspect one of the hole and the mark of each of the pellet-shaped articles and compare the hole against a hole specification and the mark against a mark specification to determine whether at least one of the hole and the mark is defective, (d) the conveyer apparatus may comprise an ejection unit to eject each of the pellet-shaped articles determined to have a defective hole and/or a defective mark by the second inspection unit, (e) the ejection unit may be configured to eject only individual pellet-shaped articles determined to have a defective hole and/or a defective mark, (f) the hole may be drilled and the mark may be printed substantially simultaneously, (g) the conveyer apparatus may comprise a feed hopper to feed pellet-shaped articles onto the conveyer, (h) the mark may be at least one of a symbol, an alphanumeric character, and artwork, (i) the hole may be cylindrical or conical in shape, (j) the first characteristic may comprise a first color of the first side of the pellet-shaped article and the second characteristic may comprise a second color of the second side of the pellet-shaped article, the first color and the second color being different, (k) the hole may be coaxial to an axis of the pellet-shaped article passing through the widest point of the pellet-shaped article transverse to the belly band, and/or (l) the conveyer apparatus may comprise a controller in communication with the first inspection unit, the processing unit, and the second inspection unit.

Another aspect of the present technology is directed to a method for inspecting and processing pellet-shaped articles, each of the pellet-shaped articles including a first side with a first characteristic, a second side with a second characteristic opposite the first side, the first characteristic being visually distinguishable from the second characteristic, and a belly band that interconnects the first side and the second side. The method may comprise: conveying a plurality of pellet-shaped articles along a predetermined conveyer path of a conveyer within carrier links that transport individual pellet-shaped articles in a vertical orientation; detecting the first characteristic and/or the second characteristic of each of the plurality of pellet-shaped articles with at least one camera of a first inspection unit; determining an orientation of each of the plurality of pellet-shaped articles based on detection of the first characteristic and/or the second characteristic with the first inspection unit; processing the first side of each of the plurality of pellet-shaped articles with one of at least two processing devices of a processing unit and processing the second side of each of the plurality of pellet-shaped articles with the other of the at least two processing devices of the processing unit based on the determined orientation of each of the plurality of pellet-shaped articles; and inspecting the hole and/or the mark of each of the plurality of pellet-shaped articles with at least one camera of a second inspection unit located on each side of the conveyer.

In examples (a) the at least two processing devices of the processing unit may include a first laser and a second laser located on opposite sides of the conveyer, processing the first side of each of the plurality of pellet-shaped articles may comprise laser-drilling a hole on the first side of each of the plurality of pellet-shaped articles with the first laser or the second laser based on the determined orientation of each of the plurality of pellet-shaped articles, and processing the second side of each of the plurality of pellet-shaped articles may comprise laser-printing a mark on the second side of each of the plurality of pellet-shaped articles with the first laser or the second laser based on the determined orientation of each of the plurality of pellet-shaped articles, (b) the first inspection unit may comprise a first camera and a second camera and the method may comprise detecting one of the first characteristic and the second characteristic with the first camera and the other of the first characteristic and the second characteristic with the second camera, (c) the second inspection unit may comprise a third camera and a fourth camera and the method may comprise detecting a third characteristic of the hole on the first side of the pellet-shaped article with one of the third camera and the fourth camera and detecting a fourth characteristic of the mark on the second side of the pellet-shaped article with the other of the third camera and the fourth camera, (d) the method may comprise determining whether the hole is defective by comparing the third characteristic against a hole specification and determining whether the mark is defective by comparing the fourth characteristic against a mark specification, (e) the method may comprise ejecting one of the plurality of pellet-shaped articles with an ejection unit when the second inspection unit detects a defective hole and/or a defective mark on said one of the plurality of pellet-shaped articles, (f) only individual pellet-shaped articles determined to have a defective hole and/or a defective mark may be ejected, (g) the method may comprise drilling the hole and printing the mark substantially simultaneously, (h) the method may comprise feeding the plurality of pellet-shaped articles from a feed hopper onto the conveyer, (i) the first characteristic may comprise a first color of the first side of the pellet-shaped article and the second characteristic may comprise a second color of the second side of the pellet-shaped article, the first color and the second color being different, (j) the hole may be coaxial to an axis of the pellet-shaped article passing through the widest point of the pellet-shaped article transverse to the belly band, (k) the mark may be at least one of a symbol, an alphanumeric character, and artwork, (l) the hole may be cylindrical or conical in shape, and/or (m) the conveyer apparatus may comprise a controller in communication with the first inspection unit, the processing unit, and the second inspection unit.

Other aspects, features, and advantages of this technology will become apparent from the following detailed description when taken in conjunction with the accompanying drawings, which are a part of this disclosure and which illustrate, by way of example, principles of this technology.

BRIEF DESCRIPTION OF THE DRAWINGS

The accompanying drawings facilitate an understanding of the various examples of this technology. In such drawings.

DETAILED DESCRIPTION

Figure 1:
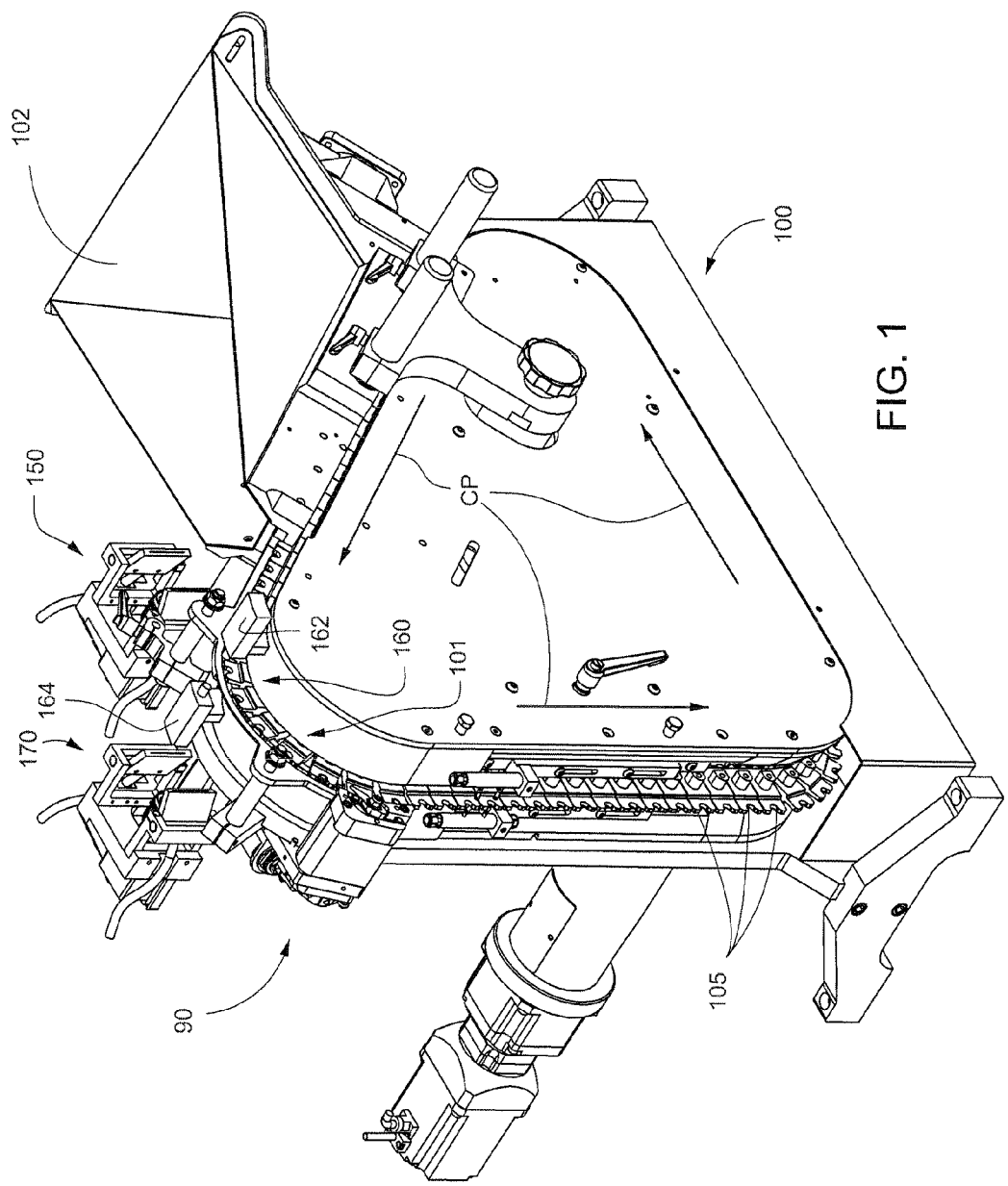
FIG. 1 is a perspective view of a conveyer apparatus including inspection, processing, and ejection units according to an example of the present technology.

Depicted in FIG. 1 is an exemplary conveyer apparatus 100 for transporting, inspecting, and processing pellet-shaped articles. In the depicted example, the conveyer apparatus 100 may include a conveyer 101 that transports the pellet-shaped articles along a conveyer path CP. The conveyer 100 may also include carrier links 105, each having a pocket to transport individual pellet-shaped articles along the conveyer path CP. It should be understood, however, that alternative examples of the technology may include carrier links 105 having multiple pockets such that each carrier link is able to transport multiple pellet-shaped articles.

Figure 5A:
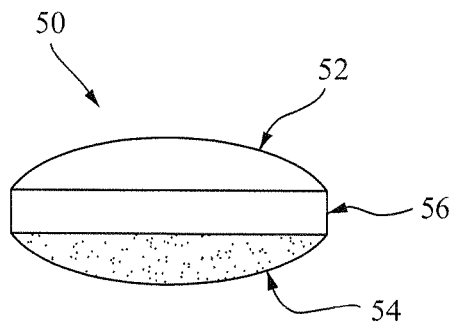
FIG. 5A is a side view of an exemplary pellet-shaped article.
Figure 5B:
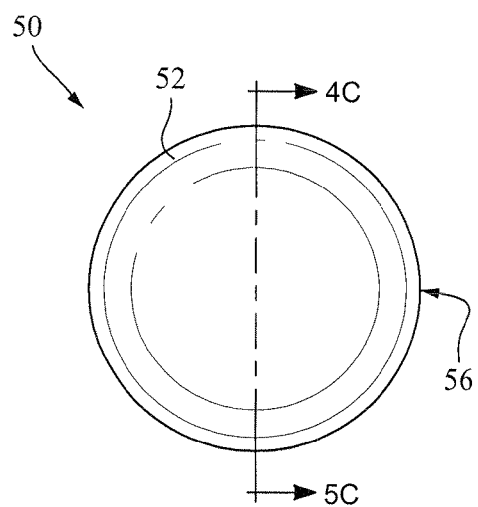
FIG. 5B is a top view of an exemplary pellet-shaped article.
Figure 5C:
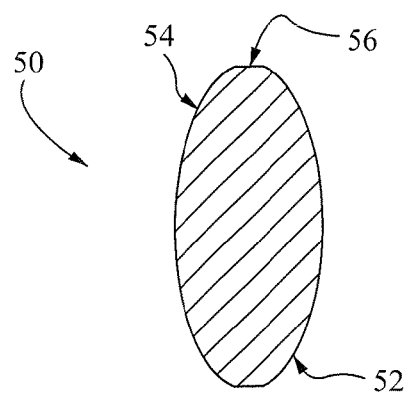
FIG. 5C is a cross-sectional view of an exemplary pellet-shaped article taken through line 5C-5C of FIG. 5B.

An exemplary pellet-shaped article 50 is shown in FIGS. 5A, 5B, and 5C. FIG. 5A shows a side view of the pellet-shaped article 50 with a first side 52, a second side 54 opposite the first side, and a belly band 56 located between the first and second sides. The first side 52 and the second side 54 may have a first characteristic and a second characteristic, respectively, that are different from one another. This is indicated in FIG. 5A by stippling on the second side. The first and second characteristics may be, for example, colors and the first side 52 may be colored differently from the second side 54. The belly band 56 may be colored the same as one of the first side and the second side, or the belly band may be colored differently from both sides. FIG. 5B shows a top view of the pellet-shaped article 50 such that the first side is visible, as well as the belly band 56. FIG. 5C shows a cross-sectional view taken through line 5C-5C of FIG. 5B. The profile of the first side 52, the second side 54, and the belly band 56 can be seen in this view.

Figure 3:
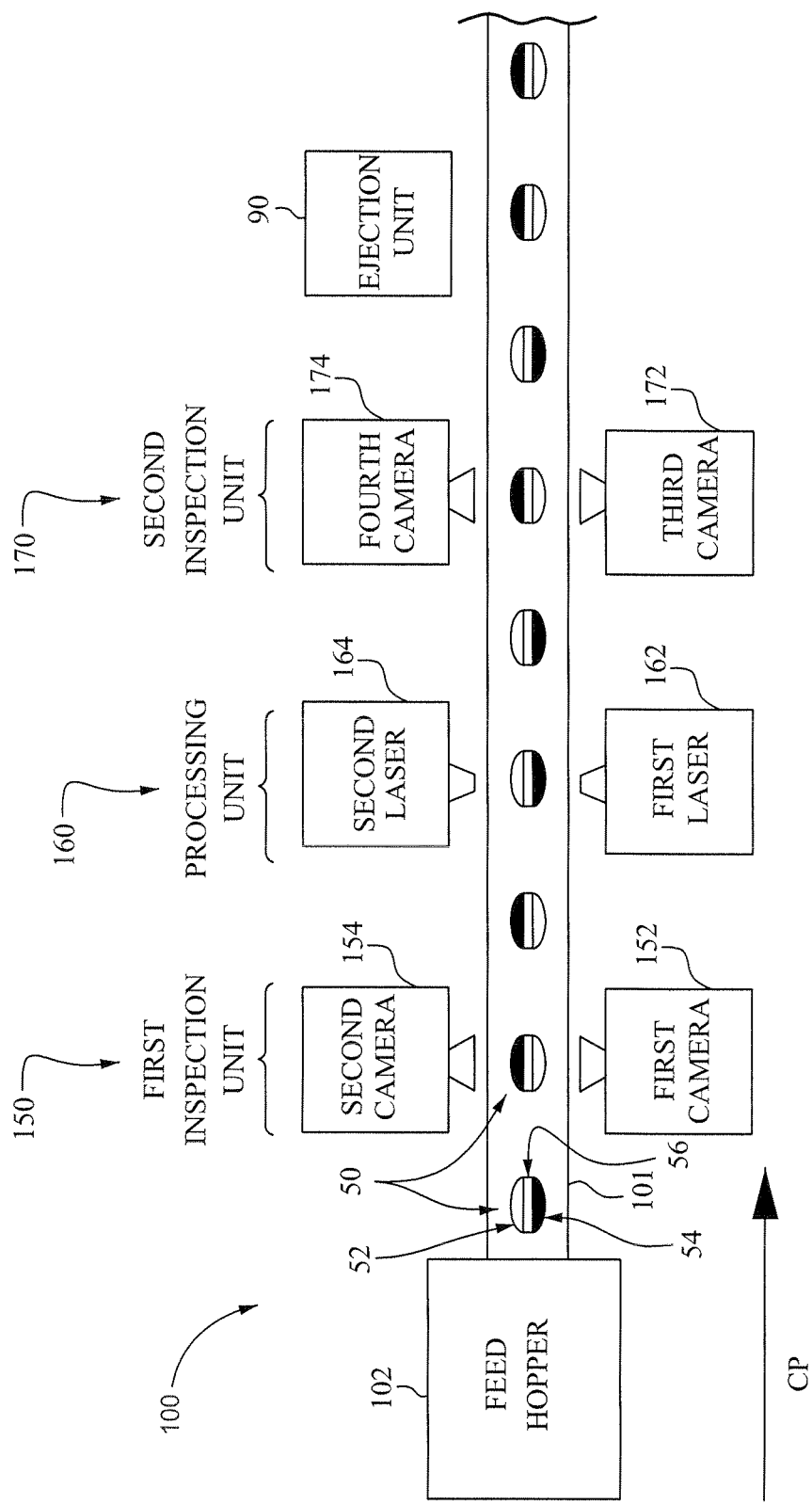
FIG. 3 is a top schematic view of a conveyer apparatus including inspection, processing, and ejection units according to an example of the present technology.
Figure 4:
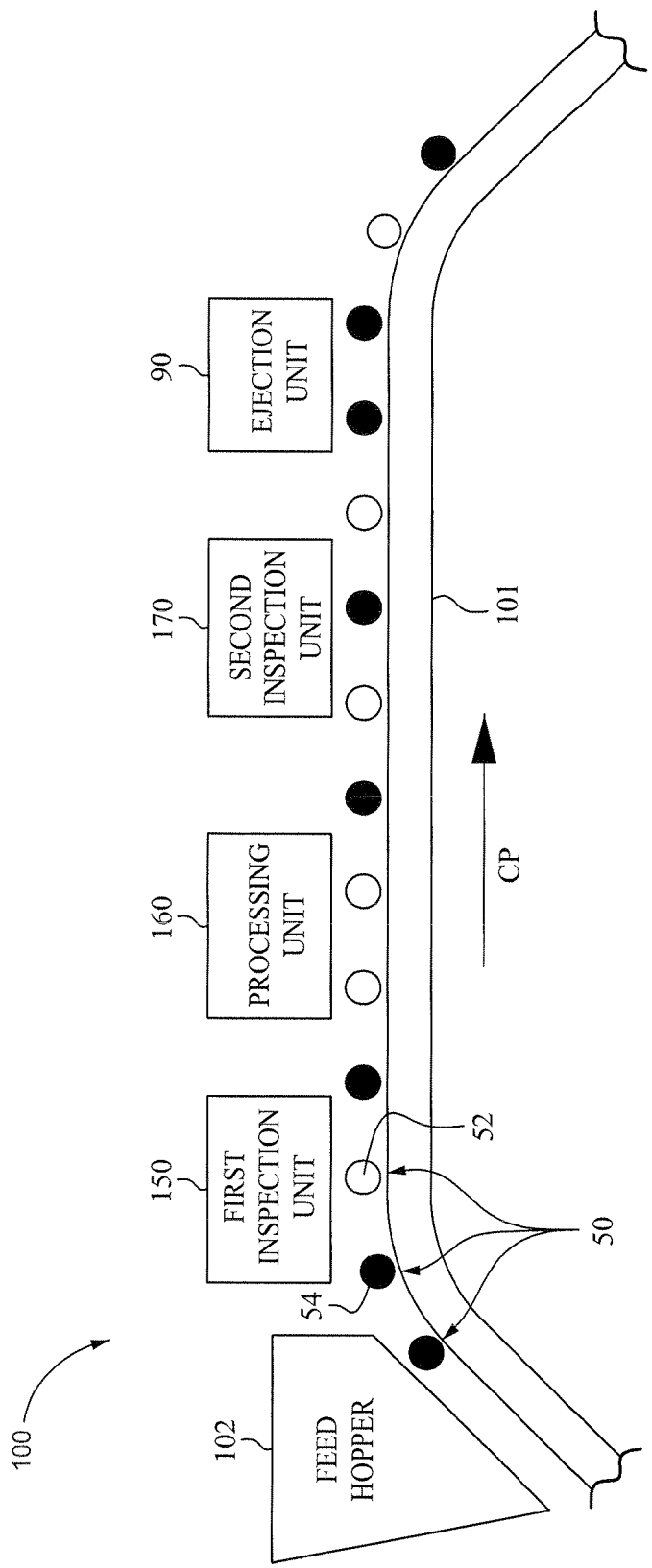
FIG. 4 is a side schematic view of a conveyer apparatus including inspection, processing, and ejection units according to an example of the present technology.

Returning to FIG. 1, the pellet-shaped articles may be fed onto the conveyer 101 by a feed hopper 102. The feed hopper may be designed to hold a large number of pellet-shaped articles supplied thereto in bulk. As the carrier links 105 of the conveyer 101 pass the feed hopper 102, pellet-shaped articles may be taken into pockets of the carrier links for inspecting and processing by the conveyer apparatus 100. The pellet-shaped articles may be fed onto the carrier links 105 in a vertical or on-edge orientation such that a plane defined through the belly band is parallel to the conveyer path CP. In other words, either the first side 52 or the second side 54 may be visible when viewed from a position transverse to the conveyer path CP, as can be seen in FIG. 4 depicting a side schematic view of the exemplary conveyer apparatus 100. FIG. 3 depicts a top schematic view of the exemplary conveyer apparatus 100. In this view, similar to FIG. 5A, the first side 52, the second side 54, and the belly band 56 are shown. This orientation may be advantageous in that the first side 52 and the second side 54 of the pellet-shaped article may be inspected and processed simultaneously as shown in FIG. 3 and described in greater detail below.

It should also be understood that, as shown in FIGS. 3 and 4, the pellet-shaped articles may be fed onto the conveyer 101 with their first and second sides 52, 54 oriented randomly relative to the conveyer path CP. This may occur as a result of the pellet-shaped articles being contained loosely in the feed hopper 102 in bulk and fed onto the conveyer 101. As will be discussed below, the randomness of the feeding of the pellet-shaped articles to the conveyer 101 may necessitate that the conveyer apparatus 100 determine the orientation of the first side 52 and the second side 54 so that each side receives the desired processing operation. An advantageous feature of this arrangement is that in examples of the present technology, the pellet-shaped articles need not be or are not inverted or flipped as they are transported on the conveyer 101 along the conveyer path CP. In other words, the orientation of the first side 52 and the second side 54 of the pellet-shaped articles does not change as the pellet-shaped articles pass along the conveyer path CP.

According to an example of the present technology, the pellet-shaped articles transported on the conveyer may pass a first inspection unit 150 as shown in FIG. 1. The first inspection unit 150 may include at least one camera for inspecting the pellet-shaped articles. The features and functions of the first inspection unit 150 will be discussed in greater detail below.

After passing the first inspection unit 150, the pellet-shaped articles may then be processed by a processing unit 160 as shown in FIG. 1. The exemplary processing unit 160 may include a first laser 162 and a second laser 164 to process the pellet-shaped articles. The features and functions of the processing unit 160 will be discussed in greater detail below.

Once processed, the pellet-shaped articles may pass a second inspection unit 170 as shown in FIG. 1. The second inspection unit 170 may include at least one camera for inspecting the pellet-shaped articles. The features and functions of the second inspection unit 170 will be discussed in greater detail below.

Once the pellet-shaped articles have passed the second inspection unit 170, they may pass an ejection unit 90 as shown in FIG. 1. The ejection unit 90 may be included in the conveyer apparatus 100 to eject pellet-shaped articles from the conveyer 101 that have been found by the inspection units to be defective and/or defectively processed.

After the pellet-shaped articles pass the ejection unit 90, they may continue on the conveyer for further inspection, processing, storage, packaging, etc.

Figure 2:
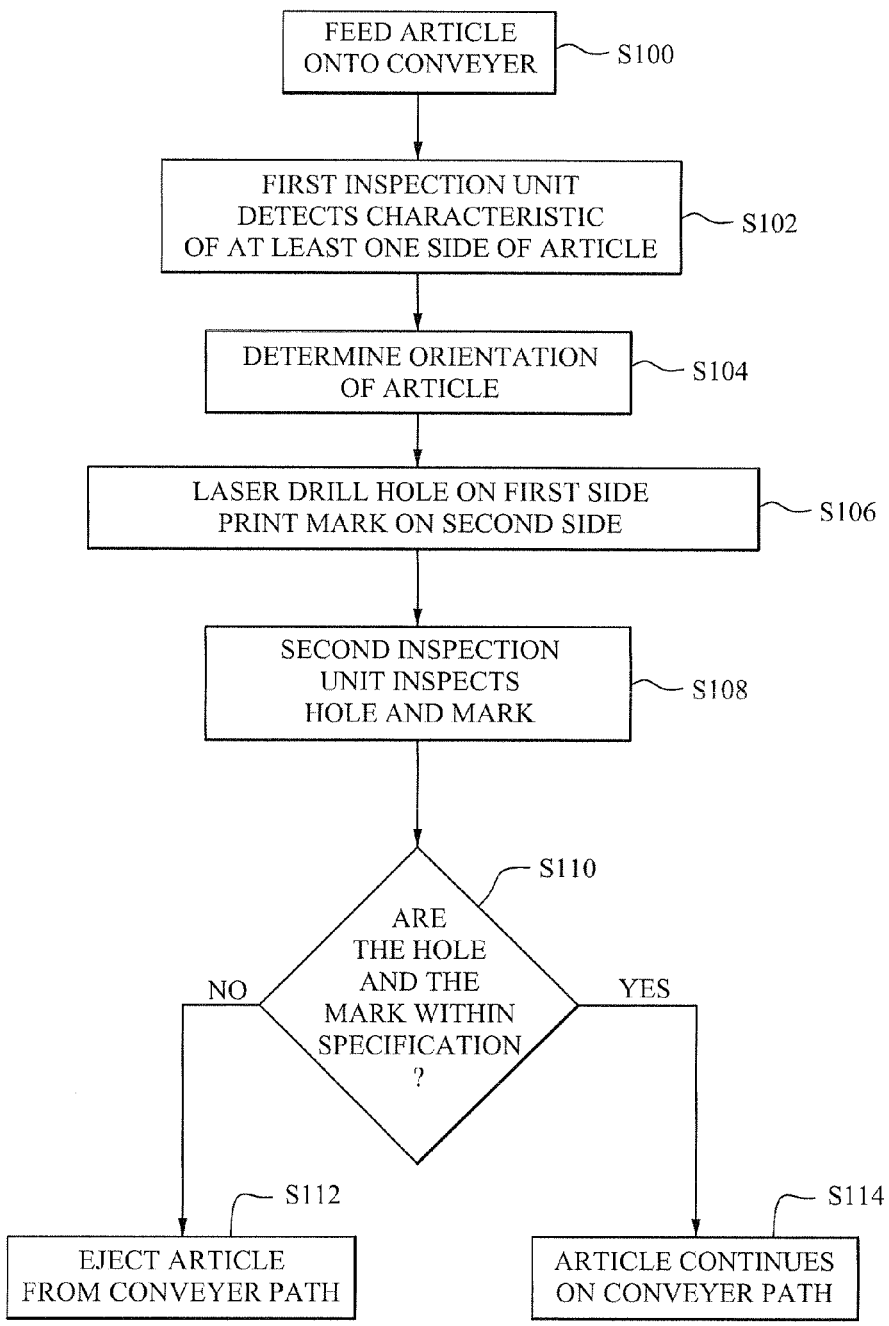
FIG. 2 is a flowchart depicting steps for inspecting and processing pellet-shaped articles according to an example of the present technology.

FIG. 2 shows a flowchart of a method for transporting, inspecting, and processing pellet-shaped articles. At S100, the pellet-shaped articles are fed onto the conveyer 101 in an on-edge orientation as described above. The conveyer 101 then transports the pellet-shaped articles to the first inspection unit 150.

At S102 the first inspection unit 150 may detect a characteristic of at least one side of the pellet-shaped article being inspected. As shown in FIG. 3, the first inspection unit 150 may include a first camera 152 and a second camera 154, each of which detect a characteristic of the side that is visible to that camera. Thus, if the first side 52 is visible to the first camera 152, then the first camera may detect the color that represents the first characteristic and the second camera 154 may detect the second characteristic of the second side 54, or vice versa. Based on the characteristic detected by each of the first camera 152 and the second camera 154, the first inspection unit 150 determines the orientation of each pellet-shaped article as shown at S104. The orientation of the first side 52 and the second side 54 may be important as it may be desirable to process the respective sides of the pellet-shaped article differently.

Furthermore, by detecting the characteristic of each side of each pellet-shaped article, the conveyer apparatus can more accurately determine the orientation of the pellet-shaped article. This may be advantageous in the situation where a pellet-shaped article was produced incorrectly such that both sides have the same color. If this condition is detected, the conveyer apparatus may determine that the pellet-shaped article is defective such that it is not processed or inspected further and ejected.

Alternatively, the first inspection unit 150 may include only one camera, the first camera 152 for example, to detect the side of the pellet-shaped article visible to the camera and determine the orientation of the first side 52 and the second side 54. Thus, if only the first camera 152 is included and this camera detects the first characteristic, then the first inspection unit 150 may determine that the first side 52 is oriented on that side of the conveyer and the second side 54 is oriented toward the opposite side.

Once the first inspection unit 150 has determined the orientation of the pellet-shaped article, it will be processed accordingly by the processing unit 160 as indicated by S106 of FIG. 2. The processing unit 160 may, in various examples of the technology, include at least two processing devices, each being located on an opposite side of the conveyer to process. The processing devices may include lasers (for laser-ing hole(s), logo(s), alphanumeric character(s), etc.), printers, composition-scanning devices, etc. As can be seen in FIGS. 1 and 3, the processing unit 160 may include the first laser 162 and the second laser 164. According to one example of the technology, the first side 52 of each pellet-shaped article is to be laser-drilled with a hole and the second side 54 is to be laser-printed with a mark. It should also be understood that the processing unit 160 may, according to one example of the technology, drill and print respective sides of individual pellet-shaped articles substantially simultaneously. The mark may include at least one of a symbol, an alphanumeric character, and artwork. The hole may be cylindrical or conical in shape. The hole may be laser-drilled coaxial to an axis of the pellet-shaped article passing through the widest point of the pellet-shaped article transverse to the belly band. The hole and the mark each may include a third characteristic and a fourth characteristic, respectively, defining some feature thereof. The third and fourth characteristics may include a dimension of the hole or the mark, the shape of the hole or the mark, a depth of the hole or mark, etc.

Since the pellet-shaped articles may be positioned on the conveyer 101 in either orientation, the first laser 162 and the second laser 164 may each be programmed to laser-drill the hole and laser-print the mark. Thus, depending on the orientation of the pellet-shaped articles on the conveyer, the first laser 162 may laser-drill the hole on the first side 52 of one of the pellet-shaped articles because the first side is oriented towards the first laser. Then the subsequent pellet-shaped article may have its second side 54 facing the first laser 162 such that the first laser will laser-print the mark on the second side of that pellet-shaped article. Therefore, it should be understood that either laser is capable of printing or drilling either side of each pellet-shaped article according to the orientation detected and determined by the first inspection unit 150.

Alternatively, the processing unit 160 may include dedicated processing devices on either side. For example, the processing unit 160 may include four lasers with two located on either side of the conveyer path CP. Each of the pair of lasers on either side of the conveyer path CP may be programmed such that one is dedicated to laser-print the mark and the other is dedicated to laser-drill the hole. Thus, the pellet-shaped articles can be properly processed regardless of orientation and without the need for lasers that perform multiple processing functions.

Once processed by the processing unit 160, the pellet-shaped articles pass to the second inspection unit 170 as shown at S108 in FIG. 2. The second inspection unit 170 may then inspect the hole and the mark of each pellet-shaped article. The second inspection unit 170 may include a third camera 172 and a fourth camera 174 to identify which side of each pellet-shaped article it is facing and inspect the processing operation performed thereon. As described above, the first inspection unit 150 may, in an alternative example, include only one camera, i.e. the first camera, to determine the orientation of pellet-shaped articles, however in such an example of the technology the second inspection unit 170 would include two cameras, i.e. the third camera and the fourth camera, so that either or both sides of the pellet-shaped articles may be inspected after processing.

According to one example, when a pellet-shaped article passes through the second inspection unit 170 each camera identifies the side of the pellet-shaped article based on whether the first characteristic or the second characteristic is detected. Then, for example, if the first characteristic is detected by the third camera 172, then the second inspection unit 170 determines that the first side 52 is facing the third camera. Accordingly, the second inspection unit 170 can compare the third characteristic of the first side 52 of the pellet-shaped article to a hole specification as shown at S110 of FIG. 2. Concurrently, the fourth camera 174 may be inspecting the opposite side of the pellet-shaped article. If the fourth camera 174 detects the second characteristic, then the second inspection unit 170 determines that the second side 54 is facing the fourth camera. Accordingly, the second inspection unit 170 can compare the fourth characteristic of the second side 54 of the pellet-shaped article to a mark specification as shown at S110 of FIG. 2. If the third camera 172 detects that the third characteristic of the hole is within the hole specification and the fourth camera 174 detects that the fourth characteristic of the mark is within the mark specification, then the pellet-shaped article may continue on the conveyer 101 according to S114 of FIG. 2. If one or both of the hole and the mark are not within their respective specification, then the second inspection unit 170 may determine that that pellet-shaped article is defective and instruct the ejection unit 90 to eject that pellet-shaped article from the conveyer 101 as in S112 of FIG. 2.

The ejection of defective pellet-shaped articles may be performed by single ejecting each defective pellet-shaped article with the ejection unit 90. Ejecting only the pellet-shaped articles determined to be defective is advantageous in that waste is avoided. Single ejection may be accomplished by an ejection system described in U.S. Pat. No. 8,381,896, which is incorporated herein by reference in its entirety. According to another example of the technology, an additional ejection unit may be included along the conveyer path CP of the conveyer apparatus 150 immediately following the first inspection unit 150 so as to allow for the ejection of pellet-shaped articles found defective by the first inspection unit.

Figure 6:
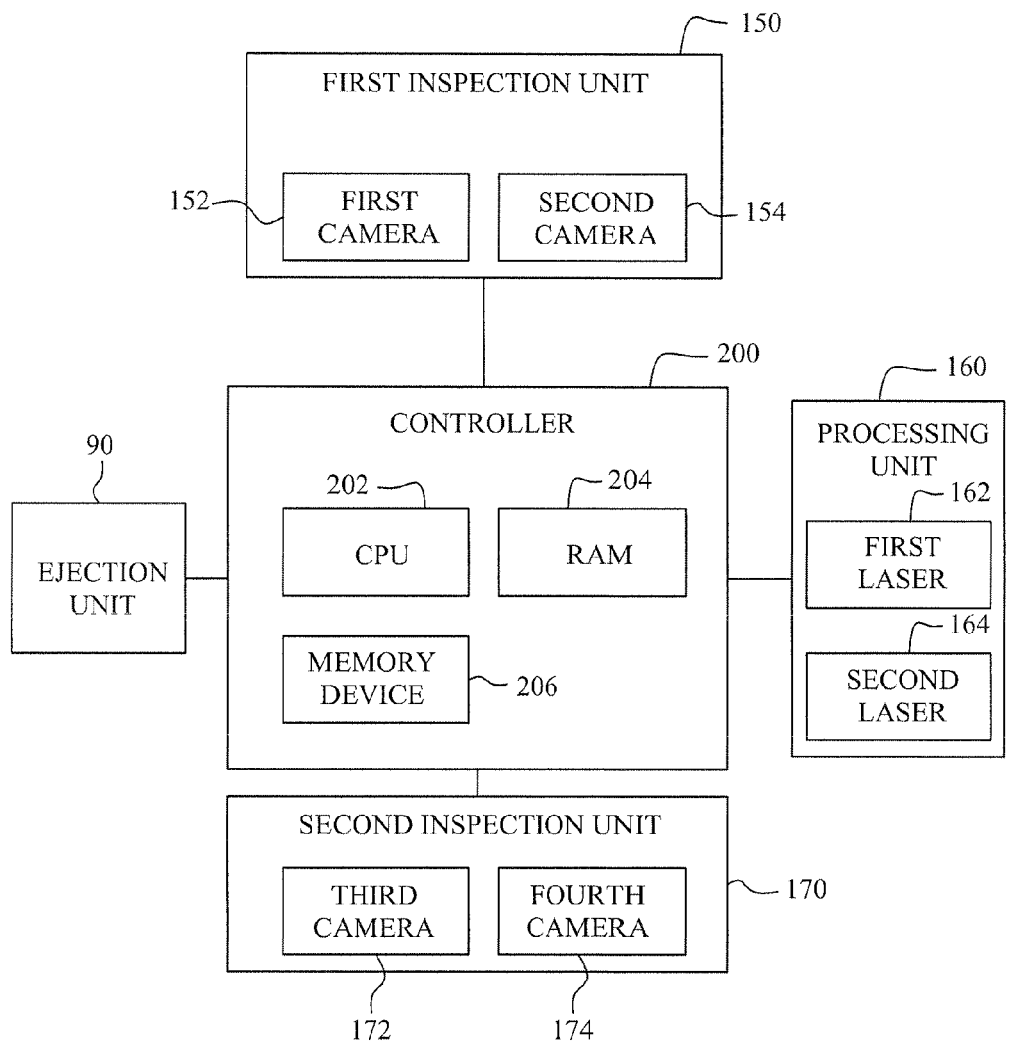
FIG. 6 is a schematic view of a control system of a conveyer apparatus according to an example of the present technology.

FIG. 6 shows a control system of a conveyer apparatus according to an example of the present technology. In addition to the first inspection unit 150, the processing unit 160, the second inspection unit 170, and the ejection unit 90, the conveyer apparatus 100 may also include a controller 200.

The controller 200 may include a central processing unit or CPU 202, RAM 204 and a memory device 206. The memory device 206 can be magnetic, flash based, solid state, or other storage technology.

The controller 200 may be included to perform functions such as the determination of the orientation of the pellet-shaped articles on the conveyer S104 and the determination of whether the hole and the mark are within their respective specification S110. Thus, the first inspection unit 150 and the second inspection unit 170 may communicate images of the pellet-shaped articles to the controller 200, which in turn performs the determination functions discussed above. Once the orientation of an individual pellet-shaped article is determined, the controller 200 may also instruct the processing unit 160 as to which processing function(s) are to be performed. Also, the second inspection unit 170 may communicate images of the pellet-shaped articles to the controller 200 to determine whether the processing functions were performed properly. Based on the orientation of the pellet-shaped articles determined previously, the controller 200 may then compare the hole and the mark, for example, to the hole and mark specifications. Then, based on that comparison, the controller 200 may instruct the ejection unit 90 to eject individual pellet-shaped articles if they are determined to be defectively processed.

Alternatively, the conveyer apparatus 100 may utilize "smart" cameras in the inspection units 150, 170 to perform the determination functions. Rather, than a controller 200 that is in communication with the functional elements as discussed above, so called "smart" cameras may individually include controllers to perform these functions within the cameras themselves. In such a case, the first inspection unit 150 and the second inspection unit 170 may be in communication with the processing unit 160 and the ejection unit 90 to provide these elements with instructions based on the determinations performed at the inspection units.

While the technology has been described in connection with various examples of the technology, it is to be understood that the technology is not to be limited to the disclosed examples, but on the contrary, is intended to cover various modifications and equivalent arrangements included within the spirit and scope of the technology. Also, the various examples described above may be implemented in conjunction with other examples, e.g., aspects of one example may be combined with aspects of another example to realize yet other examples. Further, each independent feature or component of any given assembly may constitute an additional example.

What is claimed is:

1. A conveyer apparatus for inspecting and processing pellet-shaped articles, each of the pellet-shaped articles including a first side with a first characteristic, a second side with a second characteristic opposite the first side, the first characteristic being visually distinguishable from the second characteristic, and a belly band that interconnects the first side and the second side, the conveyer apparatus comprising:

a conveyer including a plurality of carrier links to convey a plurality of pellet-shaped articles along a predetermined conveyer path, each carrier link having a pocket to receive and transport a pellet-shaped article in a vertical orientation along the predetermined conveyer path;

a first inspection unit including at least one camera to inspect the first side and/or the second side of each of the pellet-shaped articles and determine an orientation of each of the pellet-shaped articles on the conveyer based on detection of the first characteristic and/or the second characteristic;

a processing unit including at least two processing devices, each located on an opposite side of the conveyer to process the first side and on the second side of each of the pellet-shaped articles based on the determined orientation; and a second inspection unit including at least one camera on each side of the conveyer to inspect the first side and/or the second side of the pellet-shaped articles after processing by the processing unit.

2. The conveyer apparatus of claim 1, wherein the at least two processing devices include a first laser and a second laser to laser-drill a hole on the first side and laser-print a mark on the second side of each of the pellet-shaped articles based on the determined orientation.

3. The conveyer apparatus of claim 2, wherein the first inspection unit comprises a first camera and a second camera, each located on an opposite side of the conveyer to inspect one of the first side and the second side of each of the pellet-shaped articles.

4. The conveyer apparatus of claim 3, wherein the second inspection unit comprises a third camera and a fourth camera, each located on an opposite side of the conveyer to inspect one of the hole and the mark of each of the pellet-shaped articles and compare the hole against a hole specification and the mark against a mark specification to determine whether at least one of the hole and the mark is defective.

5. The conveyer apparatus of claim 4, further comprising an ejection unit to eject each of the pellet-shaped articles determined to have a defective hole and/or a defective mark by the second inspection unit.

6. The conveyer apparatus of claim 5, wherein the ejection unit is configured to eject only individual pellet-shaped articles determined to have a defective hole and/or a defective mark.

7. The conveyer apparatus of claim 6, wherein the hole is drilled and the mark is printed substantially simultaneously.

8. The conveyer apparatus of claim 7, further comprising a feed hopper to feed pellet-shaped articles onto the conveyer.

9. The conveyer apparatus of claim 8, wherein the mark is at least one of a symbol, an alphanumeric character, and artwork.

10. The conveyer apparatus of claim 9, wherein the hole is cylindrical or conical in shape.

11. The conveyer apparatus of claim 10, wherein the first characteristic comprises a first color of the first side of the pellet-shaped article and the second characteristic comprises a second color of the second side of the pellet-shaped article, the first color and the second color being different.

12. The conveyer apparatus of claim 11, wherein the hole is coaxial to an axis of the pellet-shaped article passing through the widest point of the pellet-shaped article transverse to the belly band.

13. The conveyer apparatus of claim 1, further comprising a controller in communication with the first inspection unit, the processing unit, and the second inspection unit.

14. A method for inspecting and processing pellet-shaped articles, each of the pellet-shaped articles including a first side with a first characteristic, a second side with a second characteristic opposite the first side, the first characteristic being visually distinguishable from the second characteristic, and a belly band that interconnects the first side and the second side, the method comprising:

conveying a plurality of pellet-shaped articles along a predetermined conveyer path of a conveyer within carrier links that transport individual pellet-shaped articles in a vertical orientation;

detecting the first characteristic and/or the second characteristic of each of the plurality of pellet-shaped articles with at least one camera of a first inspection unit;

determining an orientation of each of the plurality of pellet-shaped articles based on detection of the first characteristic and/or the second characteristic with the first inspection unit;

processing the first side of each of the plurality of pellet-shaped articles with one of at least two processing devices of a processing unit by providing a mark and/or a hole on the first side and processing the second side of each of the plurality of pellet-shaped articles with the other of the at least two processing devices of the processing unit by providing the mark and/or the hole on the first side, based on the determined orientation of each of the plurality of pellet-shaped articles; and inspecting the hole and/or the mark of each of the plurality of pellet-shaped articles with at least one camera of a second inspection unit located on each side of the conveyer.

15. The method of claim 14, wherein the at least two processing devices of the processing unit include a first laser and a second laser located on opposite sides of the conveyer, wherein processing the first side of each of the plurality of pellet-shaped articles comprises laser-drilling a hole on the first side of each of the plurality of pellet-shaped articles with the first laser or the second laser based on the determined orientation of each of the plurality of pellet-shaped articles, and wherein processing the second side of each of the plurality of pellet-shaped articles comprises laser-printing a mark on the second side of each of the plurality of pellet-shaped articles with the first laser or the second laser based on the determined orientation of each of the plurality of pellet-shaped articles.

16. The method of claim 15, wherein the first inspection unit comprises a first camera and a second camera, and wherein the method further comprises detecting one of the first characteristic and the second characteristic with the first camera and the other of the first characteristic and the second characteristic with the second camera.

17. The method of claim 16, wherein the second inspection unit comprises a third camera and a fourth camera, and wherein the method further comprises detecting a characteristic of the hole on the first side of the pellet-shaped article with one of the third camera and the fourth camera and detecting a characteristic of the mark on the second side of the pellet-shaped article with the other of the third camera and the fourth camera.

18. The method of claim 17, further comprising determining whether the hole is defective by comparing the characteristic of the hole against a hole specification and determining whether the mark is defective by comparing the characteristic of the mark against a mark specification.

19. The method of claim 18, further comprising ejecting one of the plurality of pellet-shaped articles with an ejection unit when the second inspection unit detects a defective hole and/or a defective mark on said one of the plurality of pellet-shaped articles.

20. The method of claim 19, wherein only individual pellet-shaped articles determined to have a defective hole or a defective mark are ejected.

21. The method of claim 20, further comprising drilling the hole and printing the mark substantially simultaneously.

22. The method of claim 21, further comprising feeding the plurality of pellet-shaped articles from a feed hopper onto the conveyer.

23. The method of claim 22, wherein the first characteristic comprises a first color of the first side of the pellet-shaped article and the second characteristic comprises a second color of the second side of the pellet-shaped article, the first color and the second color being different.

24. The method of claim 23, wherein the hole is coaxial to an axis of the pellet-shaped article passing through the widest point of the pellet-shaped article transverse to the belly band.

25. The method of claim 24, wherein the mark is at least one of a symbol, an alphanumeric character, and artwork.

26. The method of claim 25, wherein the hole is cylindrical or conical in shape.

27. The method of claim 14, wherein the conveyer apparatus further comprises a controller in communication with the first inspection unit, the processing unit, and the second inspection unit.

* * * * *